US009075856B2

(12) United States Patent
Dantkale et al.

(10) Patent No.: US 9,075,856 B2
(45) Date of Patent: Jul. 7, 2015

(54) SYSTEMS AND METHODS FOR DISTRIBUTING REPLICATION TASKS WITHIN COMPUTING CLUSTERS

(71) Applicant: Symantec Corporation, Mountain View, CA (US)

(72) Inventors: Suhas Dantkale, Sunnyvale, CA (US); Yojana Raut, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 188 days.

(21) Appl. No.: 13/856,829

(22) Filed: Apr. 4, 2013

(65) Prior Publication Data

US 2014/0279884 A1  Sep. 18, 2014

(30) Foreign Application Priority Data

Mar. 14, 2013 (IN) .............................. 287/KOL/2013

(51) Int. Cl.
  *G06F 17/00* (2006.01)
  *G06F 17/30* (2006.01)
(52) U.S. Cl.
  CPC ................................ *G06F 17/30575* (2013.01)
(58) Field of Classification Search
  None
  See application file for complete search history.

(56) References Cited

U.S. PATENT DOCUMENTS

| | | | |
|---|---|---|---|
| 7,346,682 B2 * | 3/2008 | Basani et al. ................. | 709/224 |
| 2002/0161884 A1 * | 10/2002 | Munger et al. ................ | 709/224 |
| 2005/0044162 A1 * | 2/2005 | Liang et al. .................... | 709/212 |
| 2005/0060608 A1 * | 3/2005 | Marchand ....................... | 714/18 |
| 2005/0114854 A1 * | 5/2005 | Padisetty et al. .................. | 718/1 |
| 2006/0155778 A1 * | 7/2006 | Sharma et al. ................ | 707/201 |
| 2009/0193122 A1 * | 7/2009 | Krishamurthy ............... | 709/226 |
| 2011/0099342 A1 * | 4/2011 | Ozdemir ........................ | 711/162 |
| 2013/0024722 A1 * | 1/2013 | Kotagiri et al. ................ | 714/6.1 |
| 2014/0032595 A1 * | 1/2014 | Makkar et al. ................ | 707/770 |
| 2014/0181018 A1 * | 6/2014 | Cadarette et al. ............. | 707/615 |

OTHER PUBLICATIONS

HP; HP OpenVMS Systems; OpenVMS Technical Journal V5; http://h71000.www7.hp.com/openvms/journal/v5/clusters.html; As accessed on Jan. 22, 2013.

Florian Haas; "Alternatives" to DRBD; Florian's Blog; http://fghaas.wordpress.com/2009/09/16/alternatives-to-drbd/; As accessed on Jan. 22, 2013.

VERITAS Software Corporation; Managing Application Availability with Application Clustering and the VERITAS Cluster Server Version 2.0; http://eval.veritas.com/downloads/pro/vcs/vcs_managing_wp.pdf; Jun. 2002; As accessed on Jan. 22, 2013.

(Continued)

*Primary Examiner* — Hung Le
(74) *Attorney, Agent, or Firm* — ALG Intellectual Property, LLC

(57) ABSTRACT

A computer-implemented method for distributing replication tasks within computing clusters may include (1) identifying a primary volume that is replicated to a secondary volume, (2) identifying a computing cluster with access to the primary volume that includes at least a first node and a second node, (3) receiving a request to write data to the primary volume, (4) logging, via the first node, the request to write the data to the primary volume to a replication log, and (5) using the replication log to replicate, via the second node, the data to the secondary volume. Various other methods, systems, and computer-readable media are also disclosed.

20 Claims, 11 Drawing Sheets

(56) References Cited

OTHER PUBLICATIONS

Concept Computer; Protection of Business-Critical Applications in SUSE Linux Enterprise Environments Virtualized with VMware vSphere 4 and SAP NetWeaver as an Example; Version 1.1; Dresden; May 13, 2011; As accessed on Jan. 22, 2013.
What is Business Continuity?; http://www.slideshare.net/ggbx/business-continuity-knowledge-share; As accessed on Jan. 22, 2013.
Bea; Bea WebLogic Server—Using WebLogic Server Clusters; Version 10.0; http://docs.oracle.com/cd/E11035_01/wls100/pdf/cluster.pdf; Mar. 30, 2007; As Accessed on Jan. 22, 2013.
Cristina L. Abad et al.; DARE: Adaptive Data Replication for Efficient Cluster Scheduling; University of Illinois, Department of Electrical and Computer Engineering; Department of Computer Science; As Accessed on Jan. 22, 2013.
Yojana Raut; Method to Distribute and Load Balance the Replication Process in High Availability Cluster Environments to Reduce CPU Consumption on the Application Server; Symantec Corporation; 2012; As Accessed on Jan. 22, 2013.

* cited by examiner

SYSTEMS AND METHODS FOR DISTRIBUTING REPLICATION TASKS WITHIN COMPUTING CLUSTERS

BACKGROUND

Computing clusters may provide various advantages over non-clustered computing systems. For example, computing clusters may provide applications with high availability, enable load balancing for large computational workloads, and/or provide more computational power with less powerful constituent nodes. As enterprises increasingly rely on applications that run within computing clusters to create, manage, and store large amounts of data, cluster-based data replication and recovery has become increasingly important.

Conventional cluster-based replication solutions may perform all replication tasks for a data resource within a computing cluster on a single node within the computing cluster. In one typical configuration, all tasks associated with replicating a data resource may be performed by the same node on which an application that writes to the data resource is running. In another typical configuration, all tasks associated with replicating a data resource may be performed by the node from which most writes to the data resource originate. Unfortunately, such configurations may increase input/output and processing loads on nodes with already high input/output and processing loads, which may negatively impact the performance of cluster-based applications. Accordingly, the instant disclosure identifies and addresses a need for additional and improved systems and methods for distributing replication tasks within computing clusters.

SUMMARY

As will be described in greater detail below, the instant disclosure generally relates to systems and methods for distributing replication tasks within computing clusters. In one example, a computer-implemented method for distributing replication tasks within computing clusters may include (1) identifying a primary volume that is replicated to a secondary volume, (2) identifying a computing cluster with access to the primary volume that includes a first node and a second node, (3) receiving a request to write data to the primary volume, (4) logging, via the first node, the request to write the data to the primary volume to a replication log, and (5) using the replication log to replicate, via the second node, the data to the secondary volume.

In some examples, only one node within the computing cluster may be capable of having read/write access to the replication log, and the computer-implemented method for distributing replication tasks within computing clusters may further include, prior to receiving the request to write the data to the primary volume configuring the first node with read/write access to the replication log and the second node with read-only access to the replication log.

In certain examples, the second node may be configured with read-only access to the replication log, and the step of using the replication log to replicate, via the second node, the data to the secondary volume may include (1) reading, at the second node, the data from the replication log, (2) replicating, via the second node, the data to the secondary volume, (3) receiving, at the second node, a notification that indicates that the data has been successfully replicated to the secondary volume, and (4) sending, via the second node, a request to the first node that instructs the first node to update the replication log to reflect the data having been successfully replicated to the secondary volume.

In other examples, more than one node within the computing cluster may be capable of having read/write access to the replication log, and the computer-implemented method for distributing replication tasks within computing clusters may further include configuring, prior to receiving the request to write the data to the primary volume, the first node and the second node with read/write access to the replication log.

In some examples, the step of logging, via the first node, the request to write the data to the primary volume to the replication log may include (1) allocating, at the first node, a position in the replication log to which the request to write the data to the primary volume can be logged and (2) logging the request to write the data to the primary volume to the position in the replication log.

In at least one example, the step of using the replication log to replicate, via the second node, the data to the secondary volume may include (1) reading, at the second node, the data from the replication log, (2) replicating, via the second node, the data to the secondary volume, (3) receiving, at the second node, a notification that indicates that the data has been successfully replicated to the secondary volume, and (4) updating, at the second node, the replication log to reflect the data having been successfully replicated to the secondary volume.

In some examples, the computer-implemented method for distributing replication tasks within computing clusters may further include, prior to receiving the request to write the data to the primary volume, (1) monitoring the input/output load on the first node, (2) determining that the input/output load on the first node is greater than the input/output load on any other node in the computing cluster, and (3) selecting, based at least in part on determining that the input/output load of the first node is greater than the input/output load of any other node in the computing cluster, the first node to log the request to write the data to the primary volume to the replication log.

In other examples, the computer-implemented method for distributing replication tasks within computing clusters may further include, prior to receiving the request to write the data to the primary volume, (1) monitoring at least one property of the computing cluster and (2) selecting, based at least in part on the property of the computing cluster, the second node to use the replication log to replicate the data to the secondary volume. In certain examples, the property of the computing cluster may include the input/output load on the second node, central-processing-unit availability on the second node, memory availability on the second node, network-bandwidth availability on the second node, whether the second node has access to the replication log, and/or whether the second node has access to a network interface required to replicate the primary volume to the secondary volume.

In some examples, the computer-implemented method for distributing replication tasks within computing clusters may further include failing over, to an additional node within the computing cluster, at least one replication task associated with replicating the primary volume to the secondary volume. In at least one example, the first node may be distinct from the second node.

In one embodiment, a system for implementing the above-described method may include (1) an identifying module programmed to identify a primary volume that is replicated to a secondary volume and a computing cluster with access to the primary volume that includes a first node and a second node, (2) a receiving module programmed to receive a request to write data to the primary volume, (3) a logging module programmed to log, via the first node, the request to write the data to the primary volume to a replication log, (4) a replicating module programmed to use the replication log to replicate, via the second node, the data to the secondary volume, and (5) at least one processor configured to execute the identifying module, the receiving module, the logging module, and the replicating module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a primary volume that is replicated to a secondary volume, (2) identify a computing cluster with access to the primary volume that includes a first node and a second node, (3) receive a request to write data to the primary volume, (4) log, via the first node, the request to write the data to the primary volume to a replication log, and (5) use the replication log to replicate, via the second node, the data to the secondary volume.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
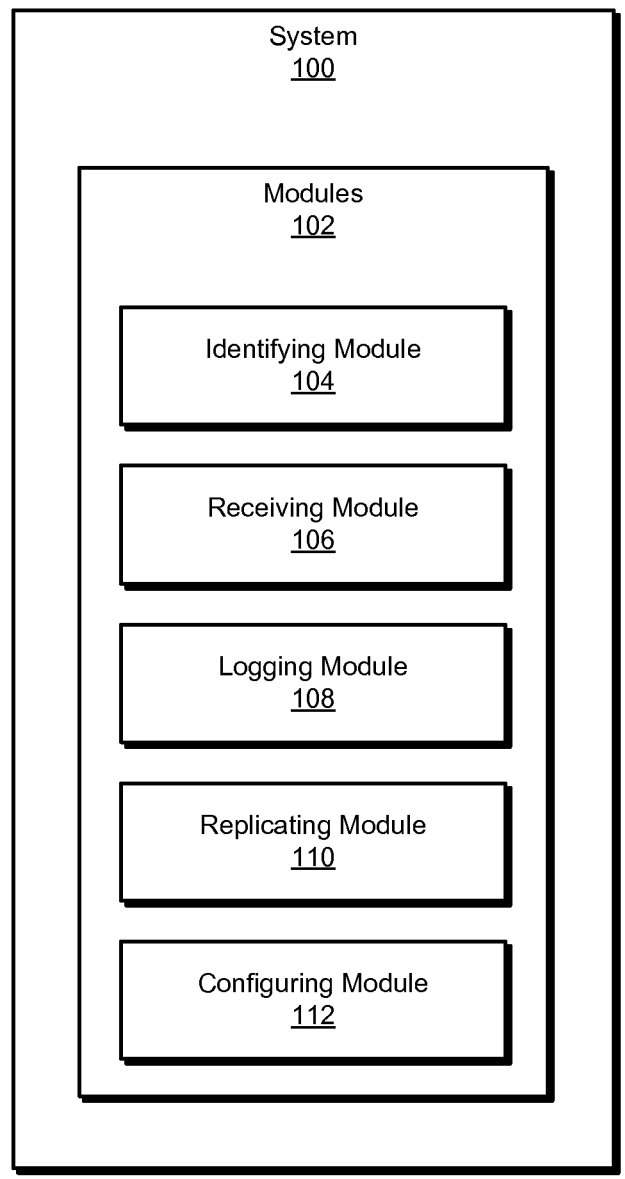
FIG. 1 is a block diagram of an exemplary system for distributing replication tasks within computing clusters.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for distributing replication tasks within computing clusters. As will be explained in greater detail below, by dividing the task of replicating cluster-based data volumes into two separate tasks (e.g., a logging task and a replicating task) and performing the separate tasks on separate computing-cluster nodes, the systems and methods described herein may achieve higher cluster-based replication throughput and/or improved cluster capacity utilization. Moreover, by monitoring the utilization of nodes within computing clusters, the systems and methods described herein may adaptively select the best nodes on which to perform replication tasks. Embodiments of the instant disclosure may also provide various other advantages and features, as discussed in greater detail below.

Figure 2:
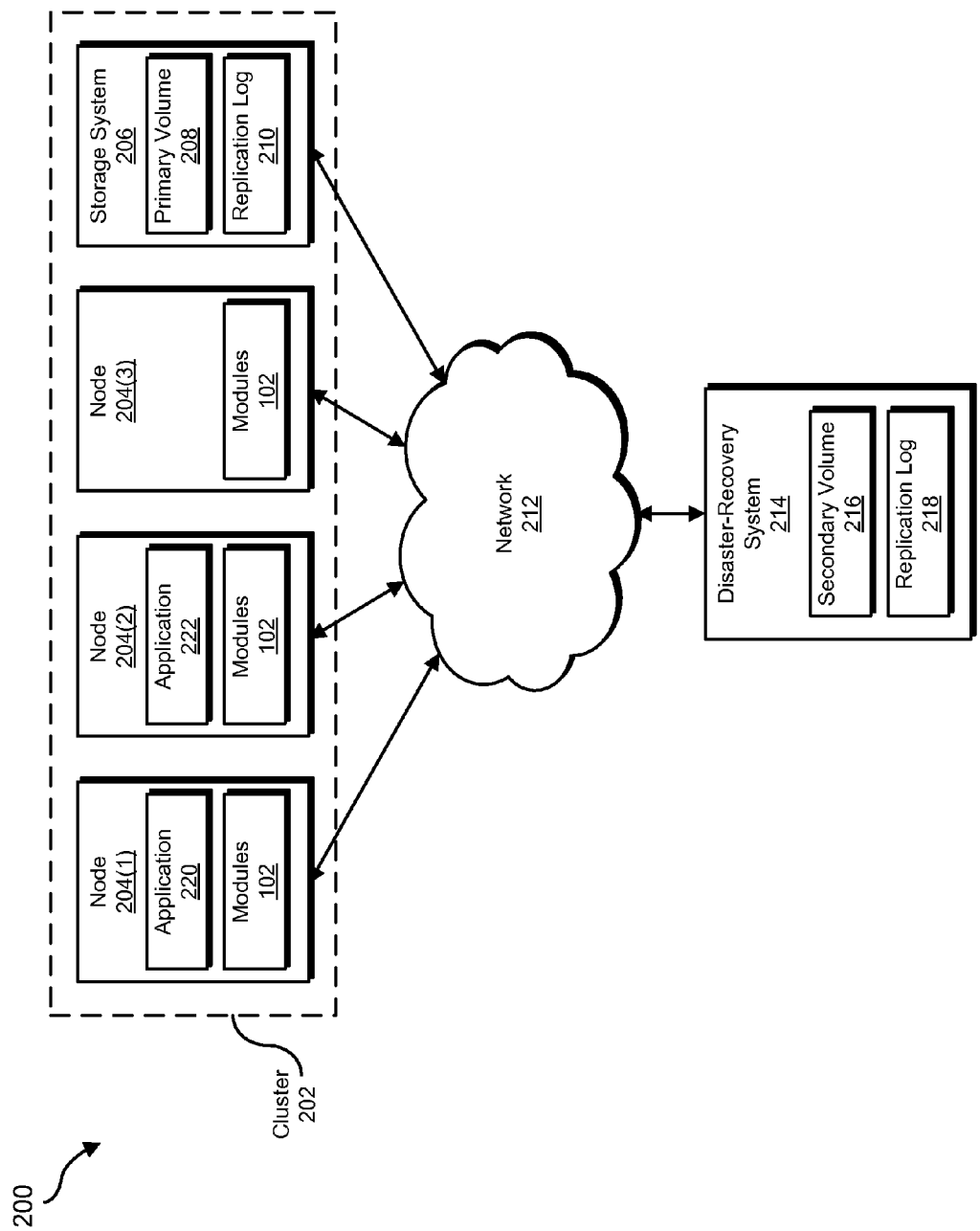
FIG. 2 is a block diagram of an exemplary system for distributing replication tasks within computing clusters.

The following will provide, with reference to FIGS. 1-2, detailed descriptions of exemplary systems for distributing replication tasks within computing clusters. Detailed descriptions of corresponding computer-implemented methods will also be provided in connection with FIGS. 3-8. In addition, detailed descriptions of an exemplary computing system and network architecture capable of implementing one or more of the embodiments described herein will be provided in connection with FIGS. 10 and 11, respectively.

FIG. 1 is a block diagram of an exemplary system 100 for distributing replication tasks within computing clusters. As illustrated in this figure, exemplary system 100 may include one or more modules 102 for performing one or more tasks. For example, and as will be explained in greater detail below, exemplary system 100 may include an identifying module 104 programmed to (1) identify a primary volume that is replicated to a secondary volume and (2) identify a computing cluster with access to the primary volume that includes a first node and a second node. Exemplary system 100 may also include a receiving module 106 programmed to receive a request to write data to the primary volume.

In addition, and as will be described in greater detail below, exemplary system 100 may include a logging module 108 programmed to log, via the first node, the request to write the data to the primary volume to a replication log. Exemplary system 100 may also include a replicating module 110 programmed to use the replication log to replicate, via the second node, the data to the secondary volume. Exemplary system 100 may further include a configuring module 112 programmed to (1) select the first node to log the request to write the data to the primary volume to the replication log and/or (2) select the second node to use the replication log to replicate the data to the secondary volume. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., nodes 204(1)-(3), storage system 206, and/or disaster-recovery system 214), computing system 1010 in FIG. 10, and/or portions of exemplary network architecture 1100 in FIG. 11. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a cluster 202 that includes nodes 204(1)-(3) and a storage system 206 and a disaster-recovery system 214 in communication via a network 212. As shown, nodes 204(1)-(3) may be programmed with one or more of modules 102. Additionally or alternatively, storage system 206 and/or disaster-recovery system 214 may be programmed with one or more of modules 102.

In one embodiment, one or more of modules 102 from FIG. 1 may, when executed by at least one processor of nodes 204(1)-(3), storage system 206, and/or disaster-recovery system 214, facilitate nodes 204(1)-(3), storage system 206, and/or disaster-recovery system 214 in distributing replication tasks within cluster 202. For example, and as will be described in greater detail below, one or more of modules 102 may cause nodes 204(1)-(3), storage system 206, and/or disaster-recovery system 214 to (1) identify a primary volume (e.g., primary volume 208) that is replicated to a secondary volume (e.g., secondary volume 216), (2) identify a cluster (e.g., cluster 202) with access to the primary volume, (3) receive a request (e.g., from application 220 or 222) to write data to the primary volume, (4) log, via a first node (e.g., node 204(1)), the request to write the data to the primary volume to a replication log(e.g., replication log 210), and (5) use the replication log to replicate, via a second node (e.g., node 204(3)), the data to the secondary volume.

Cluster 202 generally represents a group of two or more nodes that are capable of communicating with one another and/or that individually and/or collectively perform tasks or access shared cluster resources in a coordinated manner. Examples of cluster 202 include, without limitation, high-availability clusters, parallel clusters, load-balancing clusters, compute clusters, Beowulf clusters, high-performance computing clusters, or any other suitable computing cluster. In one example, cluster 202 may represent a group of nodes configured to ensure that one or more applications (e.g., applications 220 and 222) are highly available. In at least one example, cluster 202 may represent a VERITAS-CLUSTER-SERVER cluster. As shown in FIG. 2, cluster 202 may include nodes 204(1)-(3) in communication via network 212. Cluster 202 may also include storage system 206 that may be accessible to nodes 204(1)-(3).

Nodes 204(1)-(3) generally represent any type or form of physical or virtual computing device capable of reading computer-executable instructions. Examples of nodes 204(1)-(3) include, without limitation, laptops, tablets, desktops, servers, cellular phones, Personal Digital Assistants (PDAs), multimedia players, embedded systems, virtual machines, hypervisors, combinations of one or more of the same, exemplary computing system 1010 in FIG. 10, or any other suitable computing device. In some examples, nodes 204(1)-(3) may represent nodes of a computing cluster that are capable of communicating with one another and/or that individually and/or collectively perform tasks or access shared cluster resources in a coordinated manner.

Storage system 206 generally represents any system capable of storing data. For example, storage system 206 may represent a collection of storage devices (e.g., hard drives and/or solid-state drives). As shown in FIG. 2, storage system 206 may include primary volume 208 and replication log 210. Primary volume 208 generally represents a logical or physical collection of data that has been replicated (e.g., copied or mirrored) to a secondary volume (e.g., secondary volume 216). In one example, primary volume 208 may represent a set of volumes to which an application (e.g., application 220 or application 222 in FIG. 2) stores its data. Replication log 210 generally represents a method used to track changes made to primary volume 208 so that the changes may be synchronously or asynchronously replicated on secondary volume 216. Examples of replication log 210 include circular buffers and/or bitmaps. In at least one example, replication log 210 may represent a STORAGE REPLICATOR LOG and/or a DATA CHANGE MAP.

Network 212 generally represents any medium or architecture capable of facilitating communication or data transfer. Examples of network 212 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 1100 in FIG. 11, or the like. Network 212 may facilitate communication or data transfer using wireless or wired connections. In one embodiment, network 212 may facilitate communication between nodes 204(1)-(3), storage system 206, and/or disaster-recovery system 214.

Disaster-recovery system 214 generally represents any system that includes replicated data. Examples of disaster-recovery system 214 may include a backup server or a backup computing cluster at a secondary site. As shown in FIG. 2, disaster-recovery system 214 may include a secondary volume 216 and a replication log 218. Secondary volume 216 generally represents a data volume that has been synchronized with primary volume 208. Replication log 218 generally represents a replication log that is used in conjunction with replication log 210 to replicate data from primary volume 208 to secondary volume 216.

Figure 3:
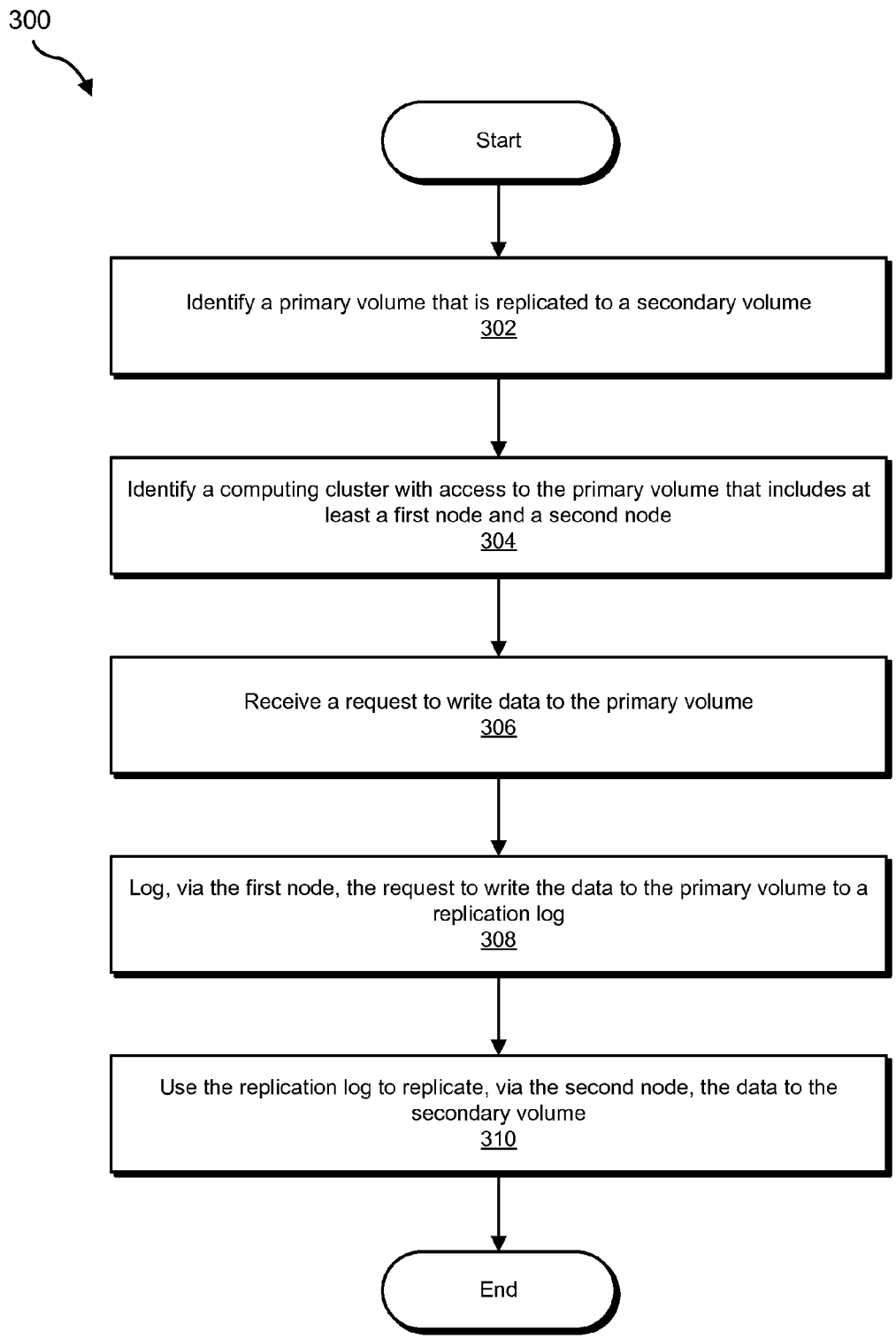
FIG. 3 is a flow diagram of an exemplary method for distributing replication tasks within computing clusters.

FIG. 3 is a flow diagram of an exemplary computer-implemented method 300 for distributing replication tasks within computing clusters. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 1010 in FIG. 10, and/or portions of exemplary network architecture 1100 in FIG. 11.

As illustrated in FIG. 3, at step 302 one or more of the systems described herein may identify a primary volume that is replicated to a secondary volume. For example, at step 302 identifying module 104 may, as part of one or more of nodes 204(1)-(3) in FIG. 2, identify primary volume 208 that is replicated to secondary volume 216.

As used herein, the term "volume" may generally refer to any logical or physical collection of data. A volume may represent and/or appear to applications and/or file systems as a physical storage device and may be used by the applications and/or file systems to store data. The term "primary volume", as used herein, may generally refer to any volume that is replicated (e.g., copied or mirrored) to a secondary volume. As used herein, the term "secondary volume" may generally refer to any volume that has been synchronized with a primary volume.

Returning to FIG. 3, the systems described herein may perform step 302 in any suitable manner. In one example, identifying module 104 may, as part of one or more of nodes 204(1)-(3), identify primary volume 208 by identifying configuration information associated with cluster 202, nodes 204(1)-(3), and/or primary volume 208. For example, identifying module 104 may represent a portion of a volume-replicating system (e.g., VERITAS VOLUME REPLICATOR) and may, as part of the volume-replicating system, identify primary volume 208 by reading a configuration file associated with primary volume 208 that indicates that primary volume 208 should be replicated to secondary volume 216. In another example, identifying module 104 may represent a portion of a cluster-managing system (e.g., VERITAS CLUSTER SERVER) and may, as part of the cluster-managing system, identify primary volume 208 by reading a configuration file associated with cluster 202 that identifies primary volume 208 as part of cluster 202.

At step 304, one or more of the systems described herein may identify a computing cluster with access to the primary volume that includes at least a first node and a second node. For example, at step 304 identifying module 104 may, as part of one or more of nodes 204(1)-(3) in FIG. 2, identify cluster 202 with access to primary volume 208.

The term "computing cluster," as used herein, generally refers to a group of two or more nodes (e.g., two or more physical and/or virtual computing devices) that are capable of communicating with one another and/or that individually and/or collectively perform tasks or access cluster resources in a coordinated manner. Examples of clusters include, without limitation, high-availability clusters, parallel clusters, load-balancing clusters, compute clusters, Beowulf clusters, high-performance computing clusters, or any other suitable computing cluster. In at least one example, the term "computing cluster" may refer to a VERITAS-CLUSTER-SERVER cluster or the like.

Nodes within computing clusters may be configured to access cluster resources in a variety of ways. In one example, all nodes within a computing cluster may be capable of having simultaneous read/write access to cluster resources (e.g., primary volumes and/or replication logs). For example, if cluster 202 in FIG. 2 was configured in this way, nodes 204(1)-(3) may each be capable of having simultaneous read/write access to primary volume 208 and replication log 210. In other examples, only one node within a computing cluster may be capable of having read/write access to cluster resources at any given time. For example, if cluster 202 in FIG. 2 was configured in this way, only one of nodes 204(1)-(3) may be capable of having read/write access to primary volume 208 and replication log 210 at any given time. As will be explained in greater detail below, the methods by which replication tasks are distributed to and perform by computing cluster nodes may be based on how access to computing-cluster resources is configured within computing clusters.

Returning to FIG. 3, the systems described herein may perform step 304 in any suitable manner. In one example, identifying module 104 may, as part of one or more of nodes 204(1)-(3), identify cluster 202 and/or determine that one or more nodes within cluster 202 has access to primary volume 208 by identifying configuration information associated with cluster 202, nodes 204(1)-(3), and/or primary volume 208. For example, identifying module 104 may represent a portion of a cluster-managing system and may, as part of the cluster-managing system, identify cluster 202 by reading a configuration file associated with cluster 202 that identifies cluster 202, nodes 204(1)-(3), and/or primary volume 208.

In some examples, after identifying module 104 has identified cluster 202, configuring module 112 may configure cluster 202 to replicate primary volume 208 to secondary volume 216 by selecting and configuring one node within cluster 202 to perform logging tasks associated with replicating primary volume 208 to secondary volume 216 and another node within cluster 202 to perform replicating tasks associated with replicating primary volume 208 to secondary volume 216. In some examples, configuring module 112 may select two separate nodes to perform the logging and replicating tasks. For example, configuring module 112 may identify and configure node 204(1) to perform the logging tasks and node 204(3) to perform the replicating tasks. In at least one example, configuring module 112 may select the same node to perform the logging and replicating tasks.

In general, configuring module 112 may select the best suited node within cluster 202 to perform the logging tasks. In one example, configuring module 112 may select node 204(1) as the best suited node to perform the logging tasks by (1) monitoring the input/output load on each node within cluster 202, (2) determining that the input/output load on node 204(1) is greater than the input/output load on any other node in cluster 202, and (3) selecting, based on determining that the input/output load of node 204(1) is greatest, node 204(1) to perform the logging tasks. Alternatively, configuring module 112 may select node 204(1) as the best suited node to perform the logging tasks by (1) determining that node 204(1) is the only node within cluster 202 with write access to primary volume 208 and/or replication log 210 and (2) selecting, based on determining that node 204(1) is the only node within cluster 202 with write access to primary volume 208 and/or replication log 210, node 204(1) to perform the logging tasks. In at least one example, configuring module 112 may select node 204(1) as the best suited node to perform the logging tasks based on user input. For example, configuring module 112 may select node 204(1) to perform the logging tasks in response to a request from an administrator of cluster 202 to perform the logging tasks on node 204(1).

Configuring module 112 may also select the best suited node within cluster 202 to perform the replicating tasks. In one example, configuring module 112 may select node 204(3) as the best suited node to perform the replicating tasks by (1) monitoring certain properties of cluster 202 (e.g., certain properties of nodes 204(1)-(3)) and (2) selecting, based on the properties of cluster 202, node 204(3) to perform the replicating tasks. For example, configuring module 112 may (1) monitor the input/output load, central-processing-unit availability, memory availability, and/or network-bandwidth availability on each node within cluster 202 and (2) select node 204(3) to perform the replicating tasks based on determining that node 204(3) has the lowest input/output load and/or the most adequate central-processing-unit availability, memory availability, and network-bandwidth availability to perform the replicating tasks.

Additionally and/or alternatively, configuring module 112 may select node 204(3) to perform the replicating tasks based on whether node 204(3) has access to resources needed to perform the replicating tasks (e.g., replication log 210 and/or network resources required to replicate primary volume 208 to secondary volume 216). In at least one example, configuring module 112 may select node 204(3) to perform the replicating tasks based on incompatibility criteria (e.g., criteria that identifies nodes that should not perform the replicating tasks). For example, incompatibility criteria may indicate that the replicating tasks should not be performed on any node that hosts an application whose writes are being replicated or that hosts more than a specified number of applications. In another example, incompatibility criteria may indicate that the replicating tasks should not be performed on any system that also hosts certain specified applications and/or virtual machines. In some examples, incompatibility criteria may also be used when failing over applications.

In at least one example, configuring module 112 may select node 204(3) as the best suited node to perform the replicating tasks based on user input. For example, configuring module 112 may select node 204(3) to perform the replicating tasks in response to a request from an administrator of cluster 202 to perform the replicating tasks on node 204(3).

Figure 4:
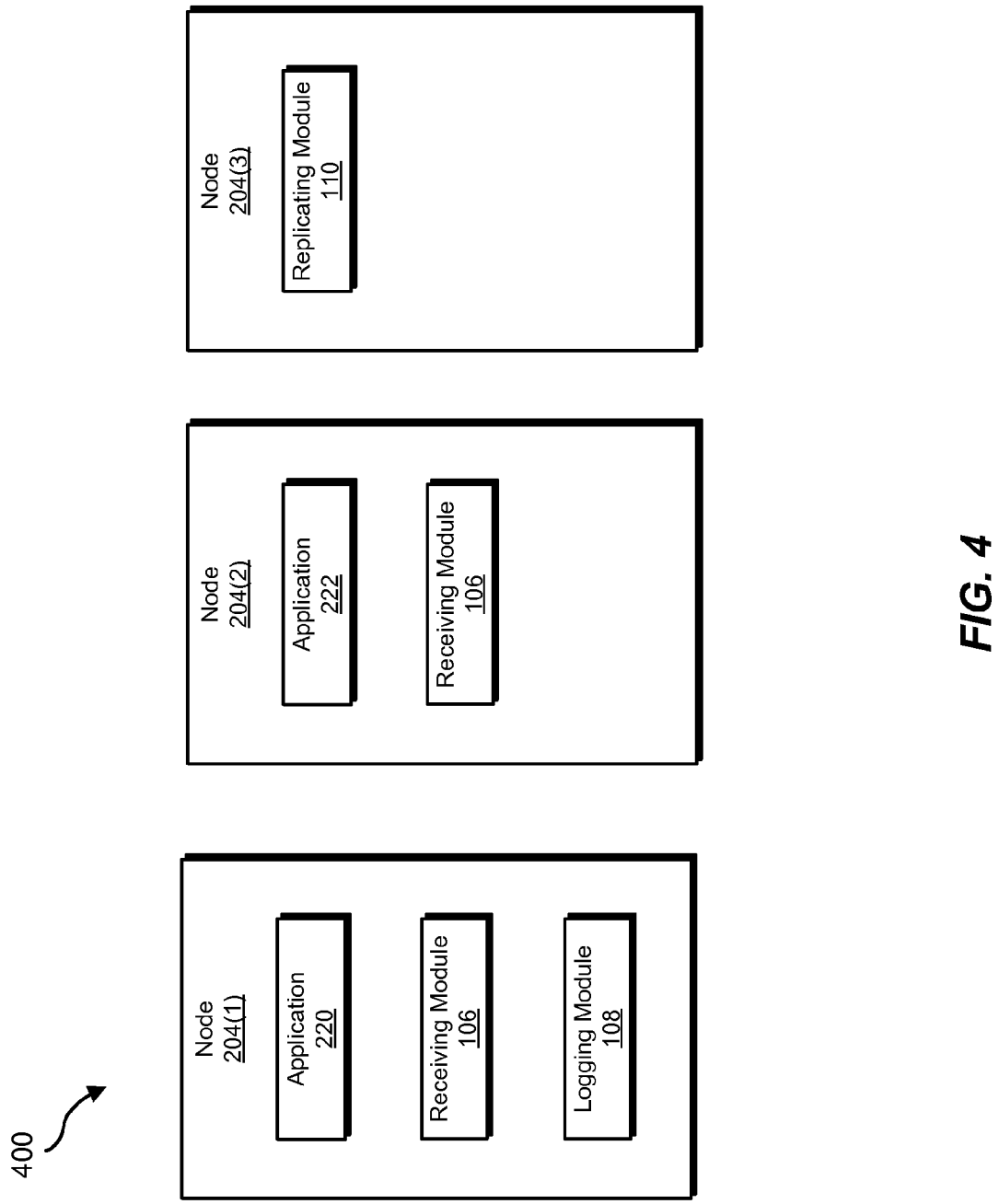
FIG. 4 is a block diagram of an exemplary system for distributing replication tasks within computing clusters.

As part of selecting and configuring nodes to perform the logging and replicating tasks associated with replicating primary volume 208 to secondary volume 216, configuring module 112 may ensure that the selected nodes have access to resources required to perform the logging and replicating tasks. For example, configuring module 112 may configure the node selected to perform the logging tasks to run logging module 108 and may configure the node selected to perform the replicating tasks to run replicating module 110 (e.g., as illustrated in FIG. 4). FIG. 4 illustrates an exemplary configuration 400 of cluster 202. In this example, configuring module 112 has (1) configured node 204(1) to run logging module 108 so that node 204(1) can perform the logging tasks associated with replicating primary volume 208 to secondary volume 216 and (2) configured node 204(3) to run replicating module 110 so that node 204(3) can perform the replicating tasks associated with replicating primary volume 208 to secondary volume 216.

In computing clusters where only one node within the computing cluster is capable of having read/write access to a replication log, configuring module 112 may configure the node selected to perform the logging tasks with read/write access to the replication log and the node selected to perform the replicating tasks with read-only access to the replication log. In computing clusters where more than one node within the computing cluster is capable of having read/write access to the replication log, configuring module 112 may configure the nodes selected to perform the logging tasks and the replicating tasks with read/write access to the replication log.

In at least one example, configuring module 112 may configure nodes to perform the logging and replicating tasks using failover resources (e.g., a set of applications and/or resources that may failover together). For example, a failover resource configured to perform the logging tasks associated with replicating primary volume 208 to secondary volume 216 may include logging module 108 and read/write access to replication log 210, and a failover resource configured to perform the replicating tasks associated with replicating primary volume 208 to secondary volume 216 may include replicating module 110, read access to replication log 210, and access to network resources required to connect to disaster-recovery system 214. In at least one example, configuring module 112 may associate failover criteria with these failover resources that indicate criteria for failing over the logging and replicating tasks to other nodes. For example, configuring module 112 may associate a central-processing-unit (CPU) usage threshold with the failover resource configured to perform the replicating tasks that indicates that when the CPU usage level of the node performing the replicating tasks crosses the CPU usage threshold, the replicating tasks should be failed over to another node in the cluster.

Configuring module 112 may select and configure nodes to perform the logging and replicating tasks at various times. For example, configuring module 112 may select and configure nodes to perform the logging and replicating tasks when a computing cluster and/or a primary volume is initialized. Additionally and/or alternatively, configuring module 112 may select and configure nodes to perform the logging and replicating tasks as part of failover or switchover operations. In at least one example, configuring module 112 may periodically reselect and/or reconfigure nodes to perform the logging and replicating tasks to ensure that the best suited and/or correct nodes within cluster 202 perform the logging and replicating tasks.

At step 306, one or more of the systems described herein may receive a request to write data to the primary volume. For example, at step 306 receiving module 106 may, as part of node 204(1) in FIG. 2, receive a request from application 220 to write data to primary volume 208.

The systems described herein may perform step 306 in any suitable manner. In one example, receiving module 106 may represent a portion of a volume-managing system (e.g., VERITAS VOLUME MANAGER) that provides access to primary volume 208 and may, as part of the volume-managing system, receive the request from application 220 to write data to primary volume 208. In another example, receiving module 106 may represent a portion of a file-system-managing system (e.g., VERITAS FILE SYSTEM) used to access files stored to primary volume 208 and may, as part of the file-system-managing system, receive a request from application 222 to write a file to primary volume 208. In other examples, receiving module 106 may represent a portion of a volume-replicating system and may, as part of the volume-replicating system, intercept a request from application 220 to write data to primary volume 208.

Figure 6:
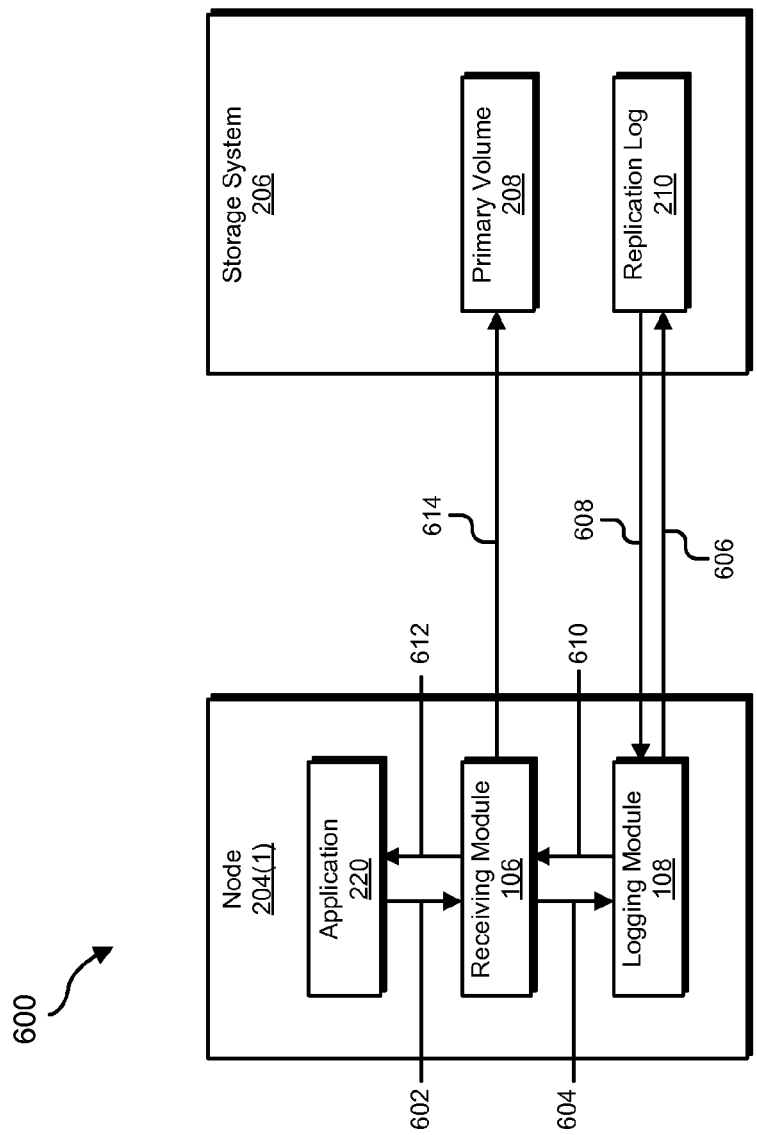
FIG. 6 is a flow diagram of an exemplary method for distributing replication tasks within computing clusters.
Figure 7:
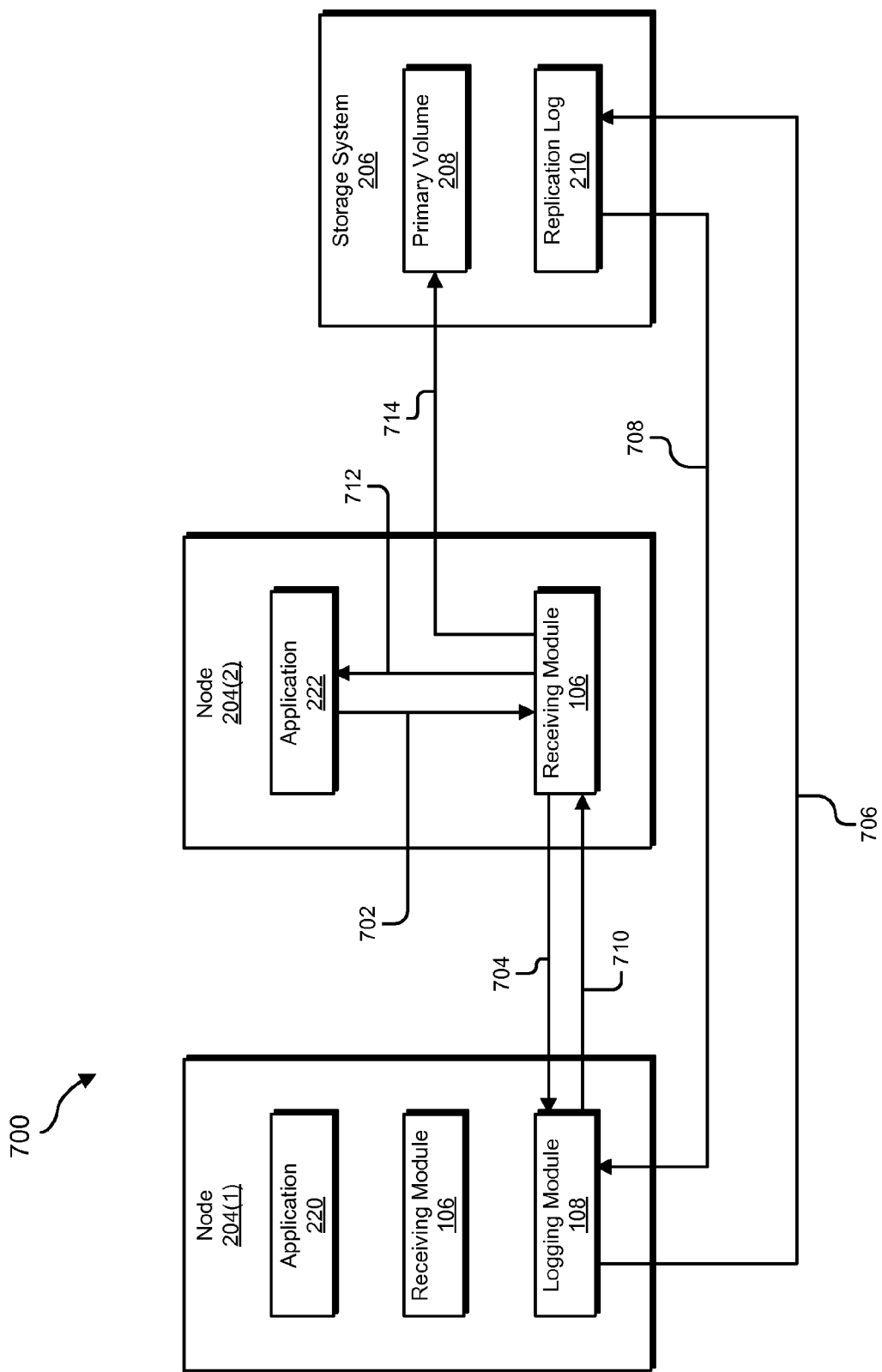
FIG. 7 is a flow diagram of an exemplary method for distributing replication tasks within computing clusters.
Figure 8:
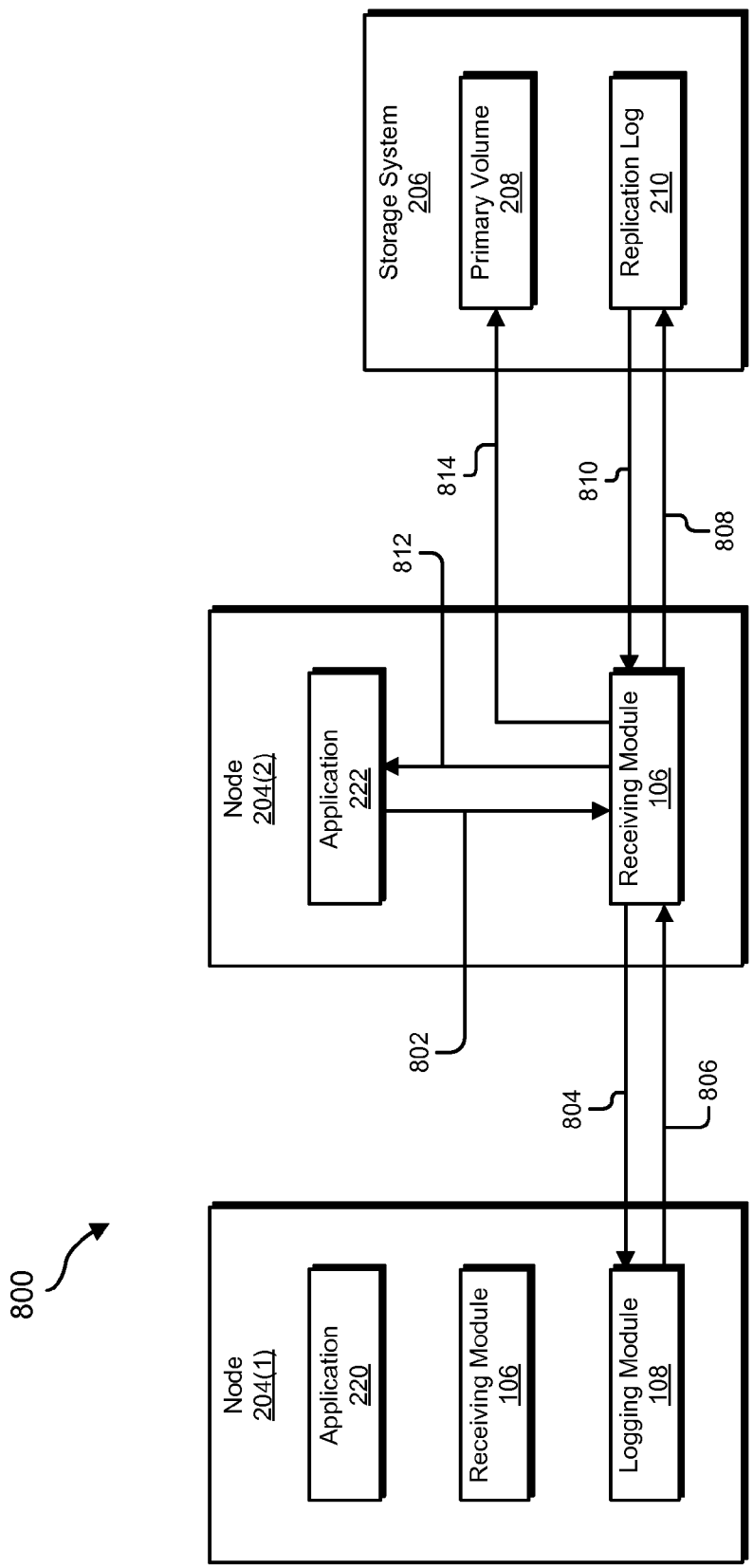
FIG. 8 is a flow diagram of an exemplary method for distributing replication tasks within computing clusters.

FIGS. 6-8 illustrate how receiving module 106 may receive, as part of nodes 204(1) and 204(2), requests to write data to primary volume 208. In the example illustrated in FIG. 6, receiving module 106 may, as part of node 204(1), receive a request from application 220 to write data to primary volume 208 (step 602). In response to receiving the request, receiving module 106 may notify logging module 108 of the request (step 604) so that logging module 108 may, as will be described in greater detail below, log the request to replication log 210. After receiving a response from logging module 108 indicating that the request was logged to replication log 210 (step 610), receiving module 106 may respond to the request from application 220 (step 612) and commit the data to primary volume 208 (step 614).

In the example illustrated in FIG. 7, receiving module 106 may, as part of node 204(2), receive a request from application 222 to write data to primary volume 208 (step 702). In response to receiving the request, receiving module 106 may notify logging module 108 on node 204(1) of the request (step 704) so that logging module 108 may, as will be described in greater detail below, log the request to replication log 210. After receiving a response from logging module 108 indicating that the request was logged to replication log 210 (step 710), receiving module 106 may respond to the request from application 222 (step 712) and commit the data to primary volume 208 (step 714).

In some examples in response to receiving a request to write data to primary volume 208, receiving module 106 may log, via logging module 108, the request to write data to replication log 210. For example as illustrated in FIG. 8, receiving module 106 may, as part of node 204(2), receive a request from application 222 to write data to primary volume 208 (step 802). In response to receiving the request, receiving module 106 may request and receive from logging module 108 running on node 204(1) a position in replication log 210 to which receiving module 106 may log the request (steps 804 and 806). Receiving module 106 may then log the request to replication log 210 (step 808). In response to receiving a notification indicating that the request was successfully logged to replication log 210 (step 810), receiving module 106 may respond to the request from application 222 (step 812) and commit the data to primary volume 208 (step 814).

Figure 5:
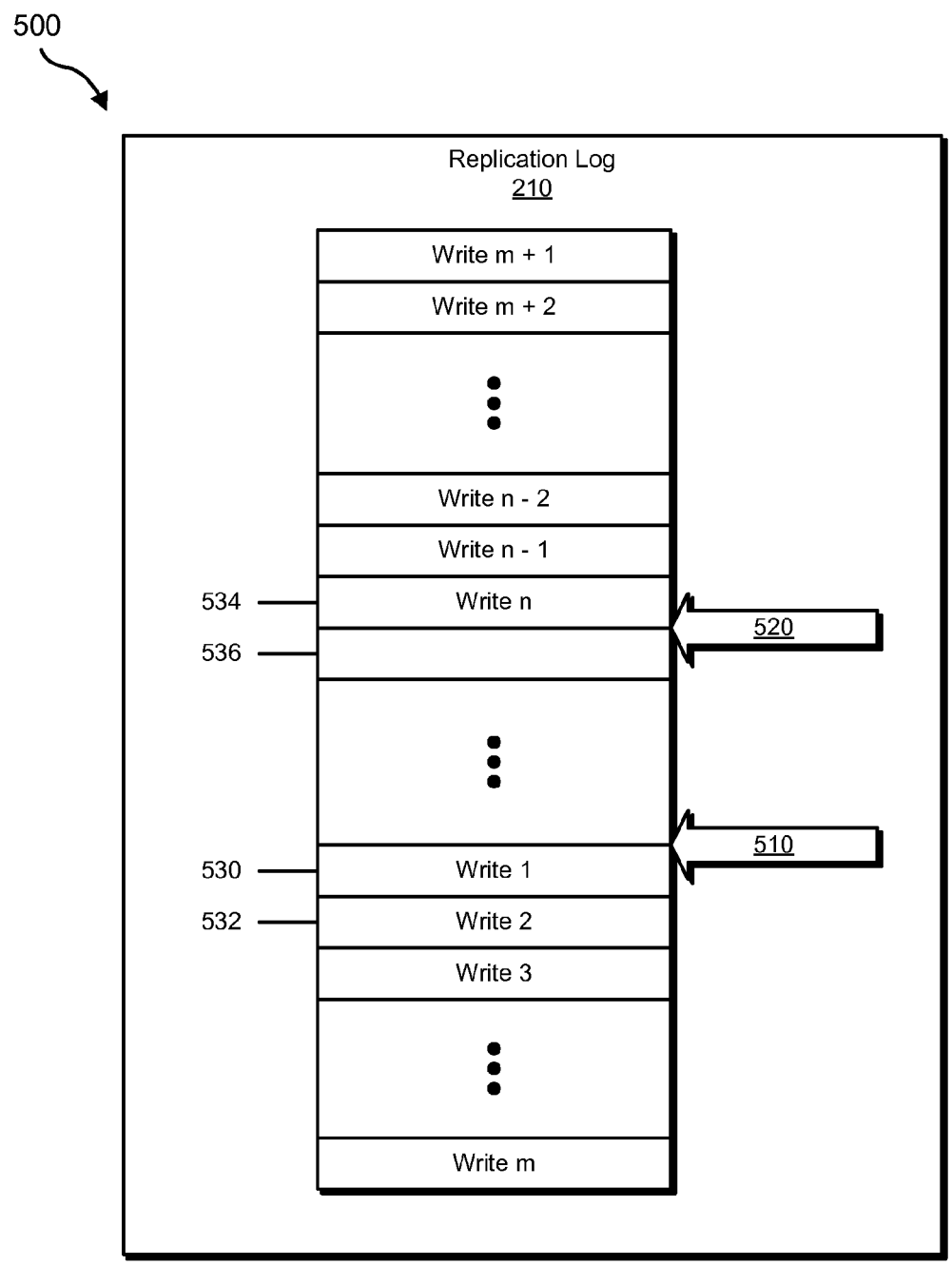
FIG. 5 is an illustration of an exemplary replication log.

Returning to FIG. 3 at step 308, one or more of the systems described herein may log, via the first node, the request to write the data to the primary volume to a replication log. For example, at step 308 logging module 108 may, as part of node 204(1), log the request to write the data to primary volume 208 to replication log 210. As used herein, the term "replication log" generally refers to any method used to track the position and/or sequence of changes made to a primary volume so that the changes may be synchronously or asynchronously replicated on an associated secondary volume. In one example, a replication log may be a circular buffer (e.g., as illustrated in FIG. 5) containing data destined for a primary volume that has not yet been committed to the primary volume and/or replicated to a secondary volume. In some examples, a replication log may be used to track the sequence in which data was written to a primary volume so that the data can be committed to a secondary volume in the same order that the data was committed to the primary volume and/or so that the data can be committed to the primary volume after the primary volume has crashed. In other examples, a replication log may be a bitmap associated with a primary volume whose bits indicate regions of data that are different between a primary volume and an associated secondary volume. Examples of replication logs include STORAGE REPLICATOR LOGS and DATA CHANGE MAPS.

FIG. 5 is an illustration of an exemplary state 500 of replication log 210. As shown in FIG. 5, replication log 210 may include a beginning 510 and an end 520. Beginning 510 may point to the position within replication log 210 that contains data that should be replicated to secondary volume 216 next. For example, beginning 510 may indicate that the data at position 530 should be replicated to secondary volume 216 next, followed by the data at position 532. As data is replicated to secondary volume 216, beginning 510 may be updated. For example, after write 1 at position 530 is replicated to secondary volume 216, beginning 510 may be updated to point to write 2 at position 532. End 520 may point to the position within replication log 210 to which data should be logged next. For example, end 520 may indicate that data should be logged to position 536 next. As data is logged to replication log 210, end 520 may be updated. For example, after write n was written to position 534, end 520 may have been updated to point to position 536.

Returning to FIG. 3 the systems described herein may perform step 308 in any suitable manner. For example, logging module 108 may, as part of node 204(1), maintain end 520 of replication log 210 and may log a request to write data to primary volume 208 by simply storing the data to the position in replication log 210 pointed to by end 520. Using FIG. 6 as an example, logging module 108 may, as part of node 204(1), log the data received from receiving module 106 at step 604 to replication log 210 by simply storing the data to the position in replication log 210 pointed to by end 520 (step 606). In response to receiving a notification that the data was successfully logged to replication log 210 (step 608), logging module 108 may update end 520 to point to the next position within replication log 210.

In some examples, logging module 108 may, as part of node 204(1), assist another node in logging requests to write data to primary volume 208 by simply storing the data to the position in replication log 210 pointed to by end 520. Using FIG. 7 as an example, logging module 108 may, as part of node 204(1), log the data received from receiving module 106 at step 704 to replication log 210 by simply storing the data to the position in replication log 210 pointed to by end 520 (step 706). In response to receiving a notification that the data was successfully logged to replication log 210 (step 708), logging module 108 may update end 520 to point to the next position within replication log 210 and/or send a response to receiving module 106 on node 204(2) indicating that the request was logged to replication log 210 (step 710) so that receiving module 106 on node 204(2) can respond to the request from application 222 (step 712) and commit the data to primary volume 208 (step 714).

Additionally and/or alternatively, logging module 108 may, as part of node 204(1), assist another node in logging requests to write data to primary volume 208 by (1) allocating, as part of node 204(1), a position in replication log 210 to which a request to write data to primary volume 208 can be logged and (2) providing the allocated position in replication log 210 to the node so that the node may log data to the position in replication log 210. Using FIG. 8 as an example, logging module 108 may, as part of node 204(1), assist receiving module 106 on node 204(2) in logging the request to write data to primary volume 208 that was received at step 802 by providing the position in replication log 210 pointed to by end 520 to receiving module 106 (step 806) so that receiving module 106 may log the data to the position in replication log 210. Logging module 108 may then update end 520 to point to the next position within replication log 210.

In at least one example, if replicating module 110 maintains beginning 510 of replication log 210 then logging module 108 may periodically query receiving module 106 for the position of replication log 210 pointed to by beginning 510 to determine whether replication log 210 has overflowed.

At step 310, one or more of the systems described herein may use the replication log to replicate, via the second node, the data to the secondary volume. For example, at step 310 replicating module 110 may, as part of node 204(3) in FIG. 2, use replication log 210 to replicate the data to secondary volume 216. Upon completion of step 310, exemplary method 300 in FIG. 3 may terminate.

Figure 9:
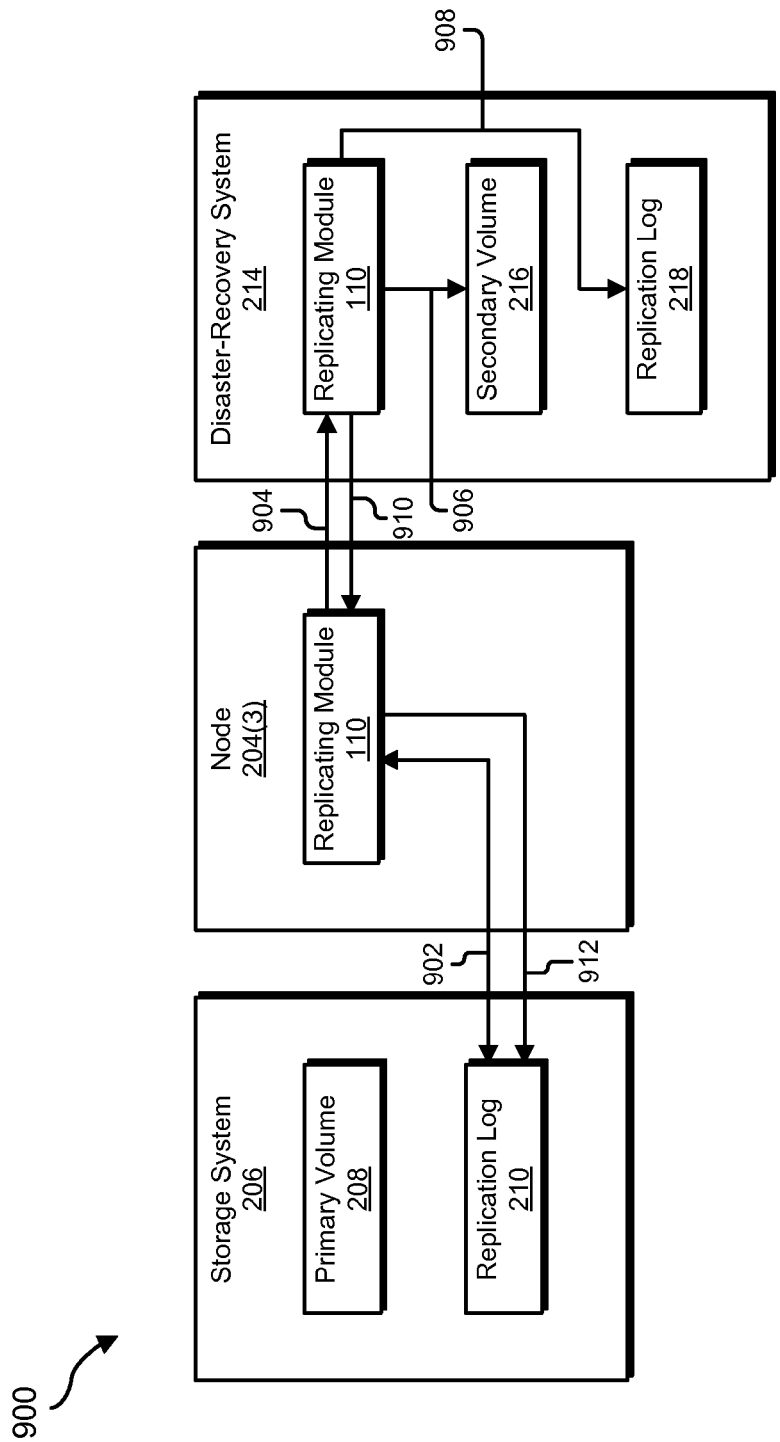
FIG. 9 is a flow diagram of an exemplary method for distributing replication tasks within computing clusters.

The systems described herein may perform step 310 in any suitable manner. In one example, replicating module 110 may maintain beginning 510 of replication log 210 and may simply replicate the data at the position of replication log 210 pointed to by beginning 510 to secondary volume 216. Using FIG. 9 as an example, replicating module 110 may, as part of node 204(3), read the data at the position of replication log 210 pointed to by beginning 510 (step 902). Upon reading the data from replication log 210, replicating module 110 may, as part of node 204(3), transmit the data from node 204(3) to disaster-recovery system 214 (step 904). In response to receiving the data, replicating module 110 may, as part of disaster-recovery system 214, store the data to secondary volume 216 and/or replication log 218 (steps 906 and 908) and then transmit a notification to node 204(3) indicating that the data has been successfully replicated to secondary volume 216 (step 910). In response to receiving, at node 204(3), the notification that indicates that the data has been successfully replicated to secondary volume 216, replicating module 110 may, as part of node 204(3), update beginning 510 to point to the next position within replication log 210 (step 912).

Returning to FIG. 3, in some instances, replicating module 110 may have read-only access to replication log 210 and/or logging module 108 may maintain beginning 510 of replication log 210. In these instances, replicating module 110 may periodically query logging module 108 for the position of replication log 210 pointed to by beginning 520 before reading data from replication log 210 and/or may send requests to logging module 108 that instructs logging module 108 to update replication log 210 to reflect data having been successfully replicated to secondary volume 216. In at least one example, replicating module 110 may periodically query logging module 108 for the position of replication log 210 pointed to by end 520 to identify how much data within replication log 210 needs to be replicated to secondary volume 216.

As explained above, by dividing the task of replicating cluster-based data volumes into two separate tasks (e.g., a logging task and a replicating task) and performing the separate tasks on separate computing-cluster nodes, the systems and methods described herein may achieve higher cluster-based replication throughput and/or improved cluster capacity utilization. Moreover, by monitoring the utilization of nodes within computing clusters, the systems and methods described herein may adaptively select the best nodes on which to perform replication tasks. For example, the systems and methods described herein may divide the task of replicating primary volume 208 to secondary volume 216 into two separate tasks and may perform the separate tasks on the nodes within cluster 202 that are best suited to performing the tasks.

Figure 10:
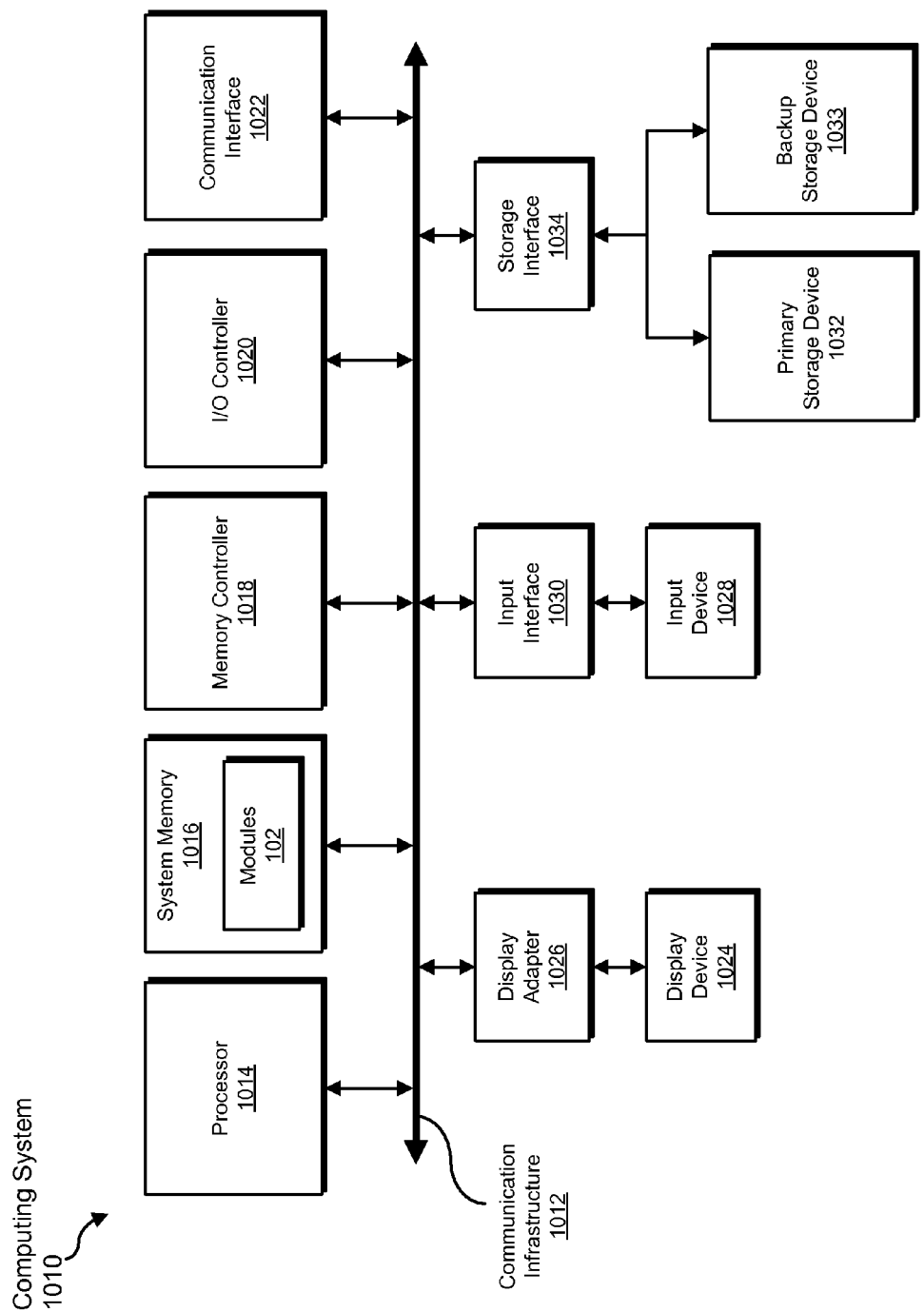
FIG. 10 is a block diagram of an exemplary computing system capable of implementing one or more of the embodiments described and/or illustrated herein.

FIG. 10 is a block diagram of an exemplary computing system 1010 capable of implementing one or more of the embodiments described and/or illustrated herein. For example, all or a portion of computing system 1010 may perform and/or be a means for performing, either alone or in combination with other elements, one or more of the identifying, receiving, logging, using, configuring, reading, replicating, sending, allocating, updating, monitoring, determining, selecting, and failing over steps described herein. All or a portion of computing system 1010 may also perform and/or be a means for performing any other steps, methods, or processes described and/or illustrated herein.

Computing system 1010 broadly represents any single or multi-processor computing device or system capable of executing computer-readable instructions. Examples of computing system 1010 include, without limitation, workstations, laptops, client-side terminals, servers, distributed computing systems, handheld devices, or any other computing system or device. In its most basic configuration, computing system 1010 may include at least one processor 1014 and a system memory 1016.

Processor 1014 generally represents any type or form of processing unit capable of processing data or interpreting and executing instructions. In certain embodiments, processor 1014 may receive instructions from a software application or module. These instructions may cause processor 1014 to perform the functions of one or more of the exemplary embodiments described and/or illustrated herein.

System memory 1016 generally represents any type or form of volatile or non-volatile storage device or medium capable of storing data and/or other computer-readable instructions. Examples of system memory 1016 include, without limitation, Random Access Memory (RAM), Read Only Memory (ROM), flash memory, or any other suitable memory device. Although not required, in certain embodiments computing system 1010 may include both a volatile memory unit (such as, for example, system memory 1016) and a non-volatile storage device (such as, for example, primary storage device 1032, as described in detail below). In one example, one or more of modules 102 from FIG. 1 may be loaded into system memory 1016.

In certain embodiments, exemplary computing system 1010 may also include one or more components or elements in addition to processor 1014 and system memory 1016. For example, as illustrated in FIG. 10, computing system 1010 may include a memory controller 1018, an Input/Output (I/O) controller 1020, and a communication interface 1022, each of which may be interconnected via a communication infrastructure 1012. Communication infrastructure 1012 generally represents any type or form of infrastructure capable of facilitating communication between one or more components of a computing device. Examples of communication infrastructure 1012 include, without limitation, a communication bus (such as an Industry Standard Architecture (ISA), Peripheral Component Interconnect (PCI), PCI Express (PCIe), or similar bus) and a network.

Memory controller 1018 generally represents any type or form of device capable of handling memory or data or controlling communication between one or more components of computing system 1010. For example, in certain embodiments memory controller 1018 may control communication between processor 1014, system memory 1016, and I/O controller 1020 via communication infrastructure 1012.

I/O controller 1020 generally represents any type or form of module capable of coordinating and/or controlling the input and output functions of a computing device. For example, in certain embodiments I/O controller 1020 may control or facilitate transfer of data between one or more elements of computing system 1010, such as processor 1014, system memory 1016, communication interface 1022, display adapter 1026, input interface 1030, and storage interface 1034.

Communication interface 1022 broadly represents any type or form of communication device or adapter capable of facilitating communication between exemplary computing system 1010 and one or more additional devices. For example, in certain embodiments communication interface 1022 may facilitate communication between computing system 1010 and a private or public network including additional computing systems. Examples of communication interface 1022 include, without limitation, a wired network interface (such as a network interface card), a wireless network interface (such as a wireless network interface card), a modem, and any other suitable interface. In at least one embodiment, communication interface 1022 may provide a direct connection to a remote server via a direct link to a network, such as the Internet. Communication interface 1022 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1022 may also represent a host adapter configured to facilitate communication between computing system 1010 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 1022 may also allow computing system 1010 to engage in distributed or remote computing. For example, communication interface 1022 may receive instructions from a remote device or send instructions to a remote device for execution.

As illustrated in FIG. 10, computing system 1010 may also include at least one display device 1024 coupled to communication infrastructure 1012 via a display adapter 1026. Display device 1024 generally represents any type or form of device capable of visually displaying information forwarded by display adapter 1026. Similarly, display adapter 1026 generally represents any type or form of device configured to forward graphics, text, and other data from communication infrastructure 1012 (or from a frame buffer, as known in the art) for display on display device 1024.

As illustrated in FIG. 10, exemplary computing system 1010 may also include at least one input device 1028 coupled to communication infrastructure 1012 via an input interface 1030. Input device 1028 generally represents any type or form of input device capable of providing input, either computer or human generated, to exemplary computing system 1010. Examples of input device 1028 include, without limitation, a keyboard, a pointing device, a speech recognition device, or any other input device.

As illustrated in FIG. 10, exemplary computing system 1010 may also include a primary storage device 1032 and a backup storage device 1033 coupled to communication infrastructure 1012 via a storage interface 1034. Storage devices 1032 and 1033 generally represent any type or form of storage device or medium capable of storing data and/or other computer-readable instructions. For example, storage devices 1032 and 1033 may be a magnetic disk drive (e.g., a so-called hard drive), a solid state drive, a floppy disk drive, a magnetic tape drive, an optical disk drive, a flash drive, or the like. Storage interface 1034 generally represents any type or form of interface or device for transferring data between storage devices 1032 and 1033 and other components of computing system 1010.

In certain embodiments, storage devices 1032 and 1033 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1032 and 1033 may also include other similar structures or devices for allowing computer software, data, or other computer-readable instructions to be loaded into computing system 1010. For example, storage devices 1032 and 1033 may be configured to read and write software, data, or other computer-readable information. Storage devices 1032 and 1033 may also be a part of computing system 1010 or may be a separate device accessed through other interface systems.

Many other devices or subsystems may be connected to computing system 1010. Conversely, all of the components and devices illustrated in FIG. 10 need not be present to practice the embodiments described and/or illustrated herein. The devices and subsystems referenced above may also be interconnected in different ways from that shown in FIG. 10. Computing system 1010 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 1010. All or a portion of the computer program stored on the computer-readable-storage medium may then be stored in system memory 1016 and/or various portions of storage devices 1032 and 1033. When executed by processor 1014, a computer program loaded into computing system 1010 may cause processor 1014 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 1010 may be configured as an Application Specific Integrated Circuit (ASIC) adapted to implement one or more of the exemplary embodiments disclosed herein.

Figure 11:
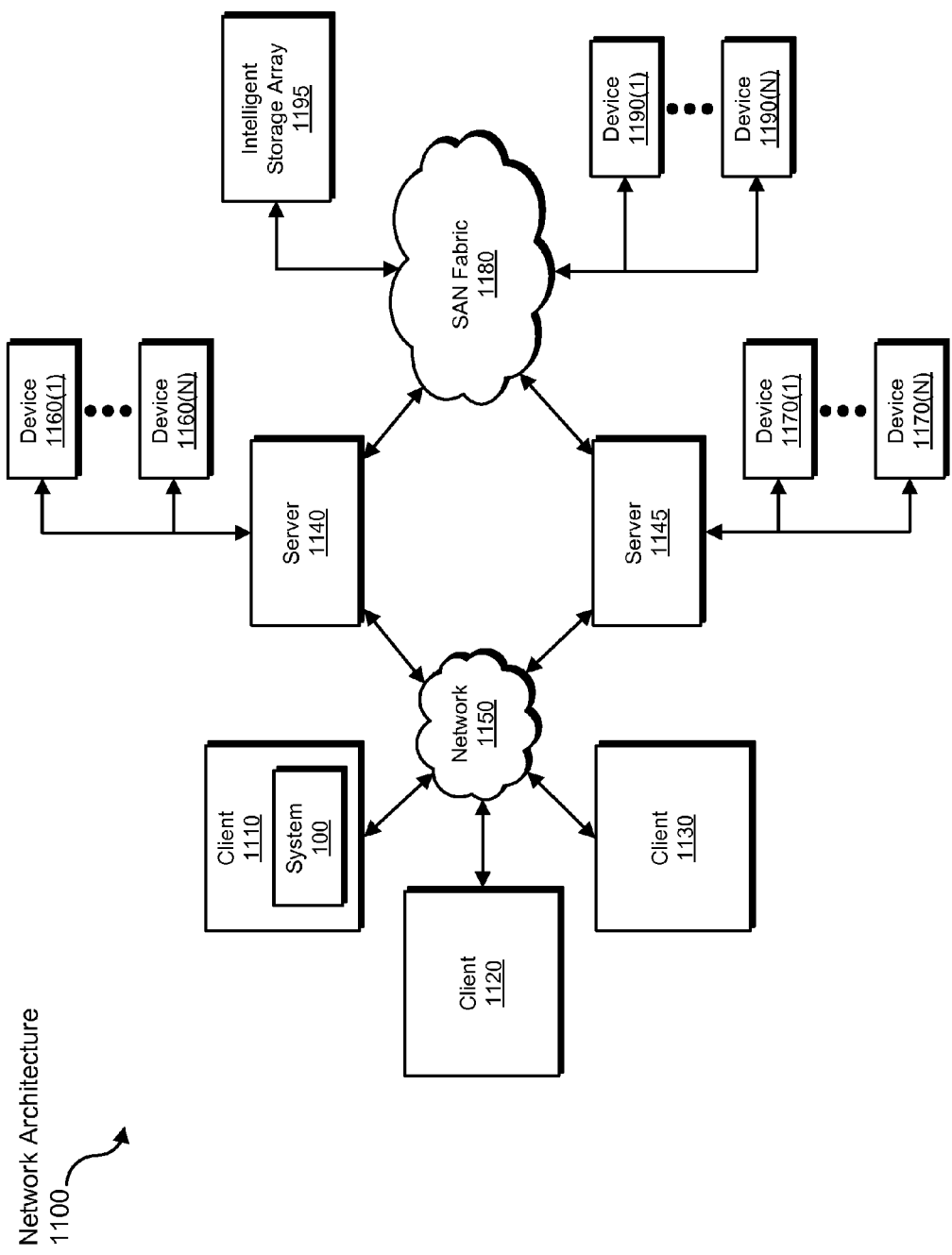
FIG. 11 is a block diagram of an exemplary computing network capable of implementing one or more of the embodiments described and/or illustrated herein.

FIG. 11 is a block diagram of an exemplary network architecture 1100 in which client systems 1110, 1120, and 1130 and servers 1140 and 1145 may be coupled to a network 1150. As detailed above, all or a portion of network architecture 1100 may perform and/or be a means for performing, either alone or in combination with other elements, one or more of the identifying, receiving, logging, using, configuring, reading, replicating, sending, allocating, updating, monitoring, determining, selecting, and failing over steps disclosed herein. All or a portion of network architecture 1100 may also be used to perform and/or be a means for performing other steps and features set forth in the instant disclosure.

Client systems 1110, 1120, and 1130 generally represent any type or form of computing device or system, such as exemplary computing system 1010 in FIG. 10. Similarly, servers 1140 and 1145 generally represent computing devices or systems, such as application servers or database servers, configured to provide various database services and/or run certain software applications. Network 1150 generally represents any telecommunication or computer network including, for example, an intranet, a WAN, a LAN, a PAN, or the Internet. In one example, client systems 1110, 1120, and/or 1130 and/or servers 1140 and/or 1145 may include all or a portion of system 100 from FIG. 1.

As illustrated in FIG. 11, one or more storage devices 1160(1)-(N) may be directly attached to server 1140. Similarly, one or more storage devices 1170(1)-(N) may be directly attached to server 1145. Storage devices 1160(1)-(N) and storage devices 1170(1)-(N) generally represent any type or form of storage device or medium capable of storing data and/or other computer-readable instructions. In certain embodiments, storage devices 1160(1)-(N) and storage devices 1170(1)-(N) may represent Network-Attached Storage (NAS) devices configured to communicate with servers 1140 and 1145 using various protocols, such as Network File System (NFS), Server Message Block (SMB), or Common Internet File System (CIFS).

Servers 1140 and 1145 may also be connected to a Storage Area Network (SAN) fabric 1180. SAN fabric 1180 generally represents any type or form of computer network or architecture capable of facilitating communication between a plurality of storage devices. SAN fabric 1180 may facilitate communication between servers 1140 and 1145 and a plurality of storage devices 1190(1)-(N) and/or an intelligent storage array 1195. SAN fabric 1180 may also facilitate, via network 1150 and servers 1140 and 1145, communication between client systems 1110, 1120, and 1130 and storage devices 1190(1)-(N) and/or intelligent storage array 1195 in such a manner that devices 1190(1)-(N) and array 1195 appear as locally attached devices to client systems 1110, 1120, and 1130. As with storage devices 1160(1)-(N) and storage devices 1170(1)-(N), storage devices 1190(1)-(N) and intelligent storage array 1195 generally represent any type or form of storage device or medium capable of storing data and/or other computer-readable instructions.

In certain embodiments, and with reference to exemplary computing system 1010 of FIG. 10, a communication interface, such as communication interface 1022 in FIG. 10, may be used to provide connectivity between each client system 1110, 1120, and 1130 and network 1150. Client systems 1110, 1120, and 1130 may be able to access information on server 1140 or 1145 using, for example, a web browser or other client software. Such software may allow client systems 1110, 1120, and 1130 to access data hosted by server 1140, server 1145, storage devices 1160(1)-(N), storage devices 1170(1)-(N), storage devices 1190(1)-(N), or intelligent storage array 1195. Although FIG. 11 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1140, server 1145, storage devices 1160(1)-(N), storage devices 1170(1)-(N), storage devices 1190(1)-(N), intelligent storage array 1195, or any combination thereof. All or a portion of one or more of the exemplary embodiments disclosed herein may also be encoded as a computer program, stored in server 1140, run by server 1145, and distributed to client systems 1110, 1120, and 1130 over network 1150.

As detailed above, computing system 1010 and/or one or more components of network architecture 1100 may perform and/or be a means for performing, either alone or in combination with other elements, one or more steps of an exemplary method for distributing replication tasks within computing clusters.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive performance metrics of a computing cluster to be transformed, transform the performance metrics into a cluster-based replication configuration for the computing cluster, output a result of the transformation to the computing cluster, use the result of the transformation to configure the computing cluster so that replication tasks are dynamically distributed among nodes within the computing cluster, and store the result of the transformation to configuration files used to configure the computing cluster. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for distributing replication tasks within computing clusters, at least a portion of the method being performed by a computing device comprising at least one processor, the method comprising:
   identifying a primary volume that is replicated to a secondary volume;
   identifying a computing cluster with access to the primary volume, the computing cluster comprising at least a first node and a second node;
   monitoring at least one property of the computing cluster;
   receiving a request to write data to the primary volume;
   selecting, based at least in part on the at least one property of the computing cluster, the first node to log the request to write the data to the primary volume to a replication log;
   selecting, based at least in part on the at least one property of the computing cluster, the second node to use the replication log to replicate the data to the secondary volume;
   logging, via the first node, the request to write the data to the primary volume to the replication log;
   using the replication log to replicate, via the second node, the data to the secondary volume.

2. The computer-implemented method of claim 1, wherein only one node within the computing cluster is capable of having read/write access to the replication log;
   further comprising, prior to receiving the request to write the data to the primary volume:
   configuring the first node with read/write access to the replication log;
   configuring the second node with read-only access to the replication log.

3. The computer-implemented method of claim 1, wherein:
   the second node is configured with read-only access to the replication log;
   using the replication log to replicate, via the second node, the data to the secondary volume comprises:
   reading, at the second node, the data from the replication log;
   replicating, via the second node, the data to the secondary volume;
   receiving, at the second node, a notification that indicates that the data has been successfully replicated to the secondary volume;
   sending, via the second node, a request to the first node that instructs the first node to update the replication log to reflect the data having been successfully replicated to the secondary volume.

4. The computer-implemented method of claim 1, wherein more than one node within the computing cluster is capable of having read/write access to the replication log;
   further comprising configuring, prior to receiving the request to write the data to the primary volume, the first node and the second node with read/write access to the replication log.

5. The computer-implemented method of claim 1, wherein logging, via the first node, the request to write the data to the primary volume to the replication log comprises:
   allocating, at the first node, a position in the replication log to which the request to write the data to the primary volume can be logged;
   logging the request to write the data to the primary volume to the position in the replication log.

6. The computer-implemented method of claim 1, wherein using the replication log to replicate, via the second node, the data to the secondary volume comprises:
   reading, at the second node, the data from the replication log;
   replicating, via the second node, the data to the secondary volume;
   receiving, at the second node, a notification that indicates that the data has been successfully replicated to the secondary volume;
   updating, at the second node, the replication log to reflect the data having been successfully replicated to the secondary volume.

7. The computer-implemented method of claim 1, wherein:
   monitoring the at least one property of the computing cluster comprises monitoring the input/output load on the first node;
   selecting the first node comprises:
   determining that the input/output load on the first node is greater than the input/output load on any other node in the computing cluster;
   selecting, based at least in part on determining that the input/output load of the first node is greater than the input/output load of any other node in the computing cluster, the first node to log the request to write the data to the primary volume to the replication log.

8. The computer-implemented method of claim 1, wherein:
   monitoring the at least one property of the computing cluster comprises monitoring at least one property of the second node;
   selecting the second node comprises selecting, based at least in part on the property of the second node, the second node to use the replication log to replicate the data to the secondary volume.

9. The computer-implemented method of claim 8, wherein the property of the second node comprises at least one of:
   the input/output load on the second node;
   central-processing-unit availability on the second node;
   memory availability on the second node;
   network-bandwidth availability on the second node;
   whether the second node has access to the replication log;
   whether the second node has access to a network interface required to replicate the primary volume to the secondary volume.

10. The computer-implemented method of claim 1, further comprising failing over, to an additional node within the computing cluster, at least one replication task associated with replicating the primary volume to the secondary volume.

11. The computer-implemented method of claim 1, wherein the first node is distinct from the second node.

12. A system for distributing replication tasks within computing clusters, the system comprising:
   an identifying module programmed to:
   identify a primary volume that is replicated to a secondary volume;

identify a computing cluster with access to the primary volume, the computing cluster comprising at least a first node and a second node;

a receiving module programmed to receive a request to write data to the primary volume;

a configuring module programmed to:
monitor at least one property of the computing cluster;
select, based at least in part on the at least one property of the computing cluster, the first node to log the request to write the data to the primary volume to a replication log;
select, based at least in part on the at least one property of the computing cluster, the second node to use the replication log to replicate the data to the secondary volume;

a logging module programmed to log, via the first node, the request to write the data to the primary volume to the replication log;

a replicating module programmed to use the replication log to replicate, via the second node, the data to the secondary volume;

at least one processor configured to execute the identifying module, the receiving module, the logging module, and the replicating module.

13. The system of claim 12, wherein:
only one node within the computing cluster is capable of having read/write access to the replication log;
the configuring module is further programmed to, prior to receiving the request to write the data to the primary volume:
configure the first node with read/write access to the replication log;
configure the second node with read-only access to the replication log.

14. The system of claim 12, wherein:
the second node is configured with read-only access to the replication log;
the replicating module is programmed to use the replication log to replicate, via the second node, the data to the secondary volume by:
reading, at the second node, the data from the replication log;
replicating, via the second node, the data to the secondary volume;
receiving, at the second node, a notification that indicates that the data has been successfully replicated to the secondary volume;
sending, via the second node, a request to the first node that instructs the first node to update the replication log to reflect the data having been successfully replicated to the secondary volume.

15. The system of claim 12, wherein:
more than one node within the computing cluster is capable of having read/write access to the replication log;
the configuring module is further programmed to configure, prior to receiving the request to write the data to the primary volume, the first node and the second node with read/write access to the replication log.

16. The system of claim 12, wherein the logging module is programmed to log, via the first node, the request to write the data to the primary volume to the replication log by:

allocating, at the first node, a position in the replication log to which the request to write the data to the primary volume can be logged;
logging the request to write the data to the primary volume to the position in the replication log.

17. The system of claim 12, wherein the replicating module is programmed to use the replication log to replicate, via the second node, the data to the secondary volume by:
reading, at the second node, the data from the replication log;
replicating, via the second node, the data to the secondary volume;
receiving, at the second node, a notification that indicates that the data has been successfully replicated to the secondary volume;
updating, at the second node, the replication log to reflect the data having been successfully replicated to the secondary volume.

18. The system of claim 12, wherein the configuring module is programmed to:
monitor the at least one property of the computing cluster by monitoring the input/output load on the first node;
select the first node by:
determining that the input/output load on the first node is greater than the input/output load on any other node in the computing cluster;
selecting, based at least in part on determining that the input/output load of the first node is greater than the input/output load of any other node in the computing cluster, the first node to log the request to write the data to the primary volume to the replication log.

19. The system of claim 12, wherein the configuring module is programmed to:
monitor the at least one property of the computing cluster by monitoring at least one property of the second node;
select the second node by selecting, based at least in part on the property of the second node, the second node to use the replication log to replicate the data to the secondary volume.

20. A non-transitory computer-readable medium comprising one or more computer-executable instructions that, when executed by at least one processor of a computing device, cause the computing device to:
identify a primary volume that is replicated to a secondary volume;
identify a computing cluster with access to the primary volume, the computing cluster comprising at least a first node and a second node;
monitor at least one property of the computing cluster;
receive a request to write data to the primary volume;
select, based at least in part on the at least one property of the computing cluster, the first node to log the request to write the data to the primary volume to a replication log;
select, based at least in part on the at least one property of the computing cluster, the second node to use the replication log to replicate the data to the secondary volume;
log, via the first node, the request to write the data to the primary volume to the replication log;
use the replication log to replicate, via the second node, the data to the secondary volume.

* * * * *